United States Patent [19]

Gopikanth et al.

[11] Patent Number: 4,508,800
[45] Date of Patent: Apr. 2, 1985

[54] CELL WITH FEBR$_3$ CATHODE

[75] Inventors: Mysore L. Gopikanth; Han C. Kuo, both of Burlington; Carl R. Schlaikjer, Winchester, all of Mass.

[73] Assignee: Duracell Inc., Bethel, Conn.

[21] Appl. No.: 509,693

[22] Filed: Jun. 30, 1983

[51] Int. Cl.$^3$ .............................................. H01M 6/14
[52] U.S. Cl. .................................... 429/196; 429/197; 429/199; 429/221; 429/232
[58] Field of Search ............... 429/101, 105, 107, 103, 429/194–196, 197–199, 221, 232

[56] References Cited

U.S. PATENT DOCUMENTS

| Re. 31,414 | 10/1983 | Dey et al. ...................... 429/196 X |
| 3,468,716 | 9/1969 | Eisenberg ............................ 429/197 |
| 3,493,433 | 2/1970 | Hoffmann ............................ 429/196 |
| 3,578,500 | 5/1971 | Maricle et al. ..................... 429/196 |
| 4,071,664 | 1/1978 | Dey .................................... 429/194 |

*Primary Examiner*—Anthony Skapars
*Attorney, Agent, or Firm*—Ronald S. Cornell; Israel Nissenbaum

[57] ABSTRACT

A non-aqeous electrochemical cell having an alkali or alkaline earth metal anode, an inorganic electrolyte comprised of an electrolyte salt and sulfur dioxide and a cathode comprised of FeBr$_3$.

10 Claims, No Drawings

CELL WITH FEBR$_3$ CATHODE

This invention relates to non-aqueous sulfur dioxide containing electrochemical cells and more particularly to such cells containing inorganic sulfur dioxide electrolytes.

It has recently been discovered that a factor involved in making viable rechargeable cells has been the elimination of the normally requisite organic cosolvents from cells containing sulfur dioxide ($SO_2$). The organic cosolvents as well as most other organic materials tend to be involved in generally irreversible reactions whereas ideally rechargeable cells require substantially complete reversibility of the components. However, such elimination of organic cosolvents has necessitated the utilization of electrolyte salts which are both soluble in the $SO_2$ alone (a generally poor solvent) and which provide a utilizable conductive electrolyte solution. An additional factor is the very high cost of some of the salts which may be used in this respect. Salts such as tetrachloroaluminates, tetrachlorogallates, tetrachloroindates as well as clovoborates of the alkali or alkaline earth metals were found to be useful in $SO_2$ alone (clovoborates are, however, very expensive). In such cells it is feasible to effectively utilize the $SO_2$ as only a solvent in the cell by using a solid cathode active material. However, not all solid cathode active materials provide a cell capacity which compares favorably with the capacity of a cell having the $SO_2$ as the cathode active material. In fact it has been nearly impossible to predict with any certainty which cathode active materials are of utility in inorganic $SO_2$ cell environments. Thus for example, different halides of the same metal, though normally equated in terms of function, have been shown to have markedly different properties particularly in the inorganic $SO_2$ cell environment.

It is an object of the present invention to provide a cathode active material for use in a non-aqueous $SO_2$ containing cell, particularly in an inorganic $SO_2$ containing cell which provides a high cell capacity.

This and other objects, features and advantages of the present invention will become more evident from the following discussion.

Generally the present invention comprises an electrochemical cell having an alkali or alkaline earth metal anode, preferably lithium, including mixtures and alloys thereof, an electrolyte comprised of $SO_2$ and an electrolyte salt soluble in $SO_2$, and a cathode comprised of $FeBr_3$. The electrolyte is preferably inorganic for rechargeable cell purposes. The $FeBr_3$ has been discovered to be a useful cathode material despite the fact that $FeCl_3$ (a halide analogue thereof) is detrimentally soluble in $SO_2$ and provides a relatively low discharge capacity.

The $FeBr_3$ cathode active material is preferably admixed with a conductive material such as graphite or carbon black in amounts ranging from 10-30% by weight thereof and a binder such as polytetrafluoroethylene (PTFE) in amounts between about 5-15%.

The electrolyte salts useful in the present invention include alkali and alkaline earth metal halide salts of aluminum, tantalum, niobium, antimony, gallium, indium and clovoborates which are insoluble in $SO_2$, particularly those having the anions $AlCl_4^-$, $TaCl_6^-$, $NbCl_6^-$, $SbCl_6^-$, $SbCl_6^{-3}$, $GaCl_4^-$, $InCl_4^-$, $B_{10}Cl_{10}^{-2}$ and $B_{12}Cl_{12}^{-2}$. The salts are utilized by dissolving them in the $SO_2$ in low concentration; i.e., about 1 molar, or, as described in copending application Ser. No. 406,980, they may be present in high concentrations with $SO_2$ in a mole equivalent ratio no greater than 1:7. Preferably, the $SO_2$ electrolyte is inorganic.

In order to more fully illustrate the present invention the following examples including comparisons with non-operable materials are presented. It is understood that such examples are for illustrative purposes and that details contained therein are not to be construed as being limitations on the present invention. Unless otherwise indicated all parts are parts by weight.

EXAMPLE 1

A cell is made with about 20 gms of a $LiAlCl_4.3SO_2$ (mole equivalent ratio) electrolyte, two lithium electrodes with each having a copper foil substrate and having the dimensions $2.5 \times 4.1 \times 0.05$ cm and a 1.5 gm cathode between the lithium electrodes comprised of 80% $FeBr_3$, 12% carbon black (Ketjenblack EC from Noury Chemical Corp.) and 8% PTFE on a nickel grid. The cathode has the dimensions $2.5 \times 4.1 \times 0.09$ cm and is separated from the lithium electrodes by non-woven glass separators. The cell is discharged at 20 mA and provides a capacity of 430 mAhr to a 1 volt cutoff and an OCV of 3.7 volts. The obtained capacity is about 394% of the theoretical capacity of $FeBr_3$.

EXAMPLE 2

A cell is made as in Example 1 but with an electrolyte of 1M $LiAlCl_4$ in $SO_2$. The obtained OCV is 3.9 volts and at 20 mA discharge provides a capacity of 420 mAhrs to a 1 volt cutoff. The obtained capacity is about 384% of the theoretical capacity of $FeBr_3$.

EXAMPLE 3

A cell is made as in Example 1 but with a 1M $LiGaCl_4$ in $SO_2$ electrolyte. The obtained OCV is 3.8 and at a 20 mA discharge rate provides a capacity of 220 mAhrs to a 1 volt cutoff. The obtained capacity is about 202% of the theoretical capacity of $FeBr_3$.

EXAMPLE 4 (COMPARATIVE)

A cell is made as in Example 2 but with a 1.8 gm cathode containing $FeCl_3$ with a thickness of 0.14 cm. The cell provides an OCV of 3.9 volts and when discharged at 20 mA provides a capacity of 123 mAhrs to a 1 volt cutoff. The obtained capacity is about 52% of the theoretical capacity of the $FeCl_3$.

EXAMPLE 5 (COMPARATIVE)

A cell is made as in Example 4 but with a 1M $LiGaCl_4$ in $SO_2$ electrolyte. The cell provides an OCV of 3.8 volts and at a dicharge rate of 20 mA provides 103 mAhrs. The obtained capacity is about 43% of the theoretical capacity of the $FeCl_3$.

It is evident from the above examples that $FeBr_3$ provides at least four times the capacity of an analagous $FeCl_3$ cathode under identical conditions and with various inorganic $SO_2$ containing electrolytes.

It is understood that the above examples are for illustrative purposes and that the present invention is not to be limited to the specifics contained therein. Changes including those involved in cell construction, components and ratios may be made without departing from the scope of the present invention as defined by the following claims.

What is claimed is:

1. A non-aqueous, electrochemical cell comprising an anode comprised of an alkali or alkaline earth metal and an inorganic electrolyte comprised of $SO_2$ with an electrolyte salt dissolved therein, characterized in that said cell contains an active cathode comprised of at least 55% by weigth of $FeBr_3$ admixed with a conductive carbon material, with said conductive carbon material comprising from 10–30% by weight of said cathode.

2. The cell of claim 1 wherein said electrolyte salt is selected from the group consisting of alkali or alkaline earth metal clovoborates and alkali and alkaline earth metal halide salts containing gallium, indium, aluminum, tantalum, niobium, or antimony.

3. The cell of claim 2 wherein said electrolyte salts are lithium salts.

4. The cell of claim 1 wherein said anode is comprised of lithium.

5. The cell of claim 1 wherein said electrolyte salt is selected from the group consisting of $LiAlCl_4$ and $LiGaCl_4$.

6. The cell of claim 1 wherein said salt is $LiAlCl_4$.

7. The cell of claim 6 wherein the mole equivalent ratio of $LiAlCl_4$ to $SO_2$ is no greater than 1:7.

8. A non-aqueous, electrochemical cell comprising a lithium anode and an inorganic electrolyte comprised of $SO_2$ and $LiAlCl_4$, characterized in that said cell contains an active cathode comprised of at least 55% by weight of $FeBr_3$ admixed with a conductive carbon material, with said conductive carbon material comprising from 10–30% by weight of said cathode.

9. The cell of claim 8 wherein the mole equivalent ratio of $LiAlCl_4$ to $SO_2$ does not exceed 1:7.

10. A non-aqueous, electrochemical cell comprising a lithium anode and an inorganic electrolyte comprised of $SO_2$ and $LiGaCl_4$, characterized in that said cell contains an active cathode comprised of at least 55% by weight of $FeBr_3$ admixed with a conductive carbon material, with said conductive carbon material comprising from 10–30% by weight of said cathode.

* * * * *